Oct. 16, 1962 J. B. BEAMAN ETAL 3,058,287
MULTIPLE CUT LAWN EDGER
Filed Sept. 23, 1959
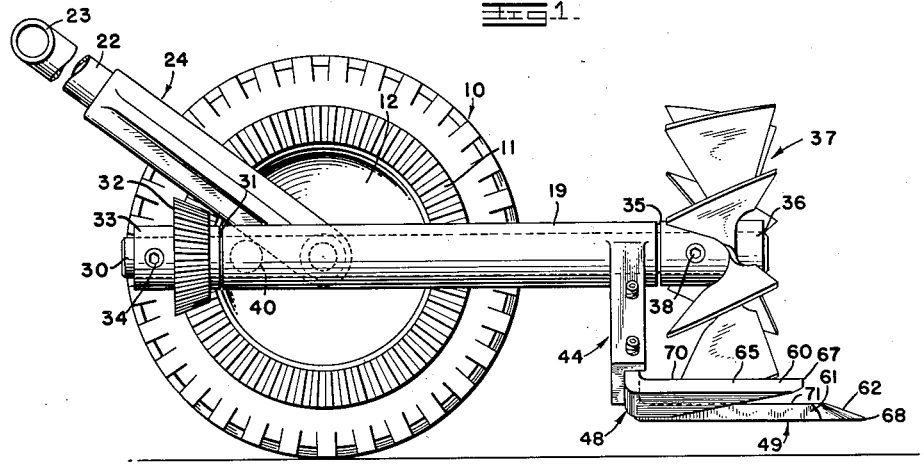
FIG. 1.
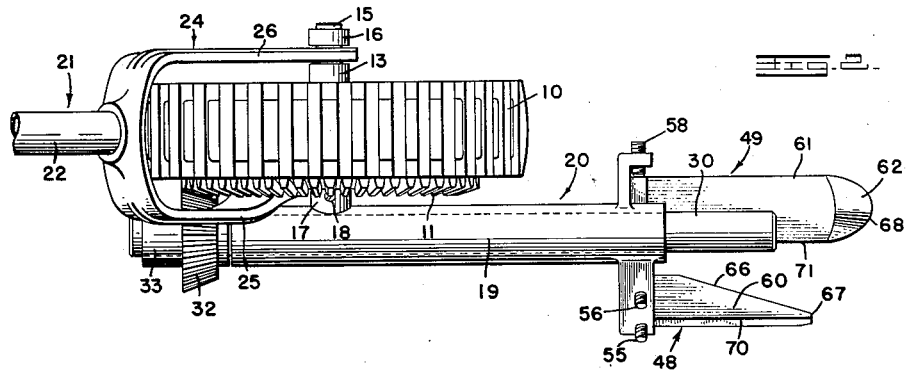
FIG. 2.
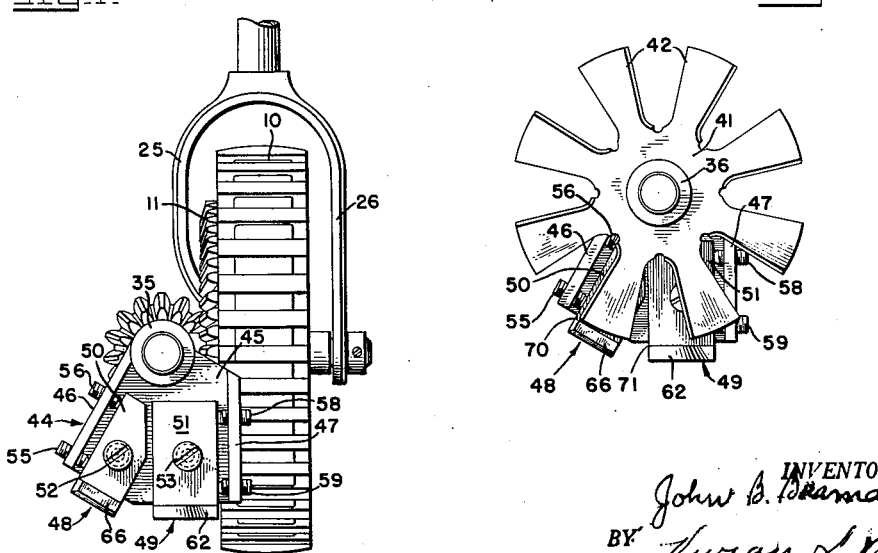
FIG. 4.
FIG. 3.
INVENTORS
John B. Beaman
BY
Shoemaker & Mattare
ATTORNEYS United States Patent Office 3,058,287
Patented Oct. 16, 1962

3,058,287
MULTIPLE CUT LAWN EDGER
John B. Beaman, 815 Church St., Ahoskie, N.C., and Vivian L. Ott, 6100 Sylvan Ave., Norfolk 8, Va.
Filed Sept. 23, 1959, Ser. No. 841,706
3 Claims. (Cl. 56—249)

This invention relates in general to a lawn trimming device and pertains, more particularly, to a device of this nature which is provided with means by which multiple cutting may be achieved so that the proper contour of the grass adjacent an obstacle, such as a walkway, building or the like, may be achieved in a single cutting or trimming operation.

In trimming a lawn, for example along a walkway, there is usually some grass which has been matted down right next to the obstacle and, therefore, lies substantially flat and then there is other grass which will be substantially vertical or perhaps angulated toward the obstacle which also needs trimming. Without extremely large machinery, it has heretofore been virtually impossible to trim all of this grass in a single operation. It is, therefore, of primary concern in connection with this invention to provide a simplified, yet highly efficient lawn edger or trimmer which is capable of a multiple cutting action and is expressly adapted for not only lifting up and cutting blades of grass which have been mashed down substantially flat but also to contour those blades which remain standing generally in the normal attitude and to, therefore, in a single operation, properly trim an edge around an obstacle.

A further object of this invention is to provide an improved lawn edging device which embodies a sweep blade disposed in a substantially vertical plane transversely to the path of movement of the mechanism and which cooperates with discrete and separate blade members, disposed at different angular dispositions relative to the periphery of the sweep blade for effecting, in a single operation, the entire contouring adjacent to an obstacle, such as a walkway, building or the like.

A further object of this invention is to provide a device in conformity with the preceding objects which includes a single wheel having a ring gear rigid therewith and associated with the wheel a cutting mechanism, including a shaft and gear driven from the ring gear and carrying a sweep blade and wherein the main body of the cutting mechanism carries a pair of circumferentially spaced cutting blades for effecting, in a single operation, contouring of grass adjacent a sidewalk or the like.

Another object of this invention is to provide a multiple blade lawn edger or trimmer utilizing one blade which is disposed in a substantially horizontal position and which is provided at such elevation above the ground surface as to pick up low lying blades of grass and, in conjunction therewith, another blade circumferentially spaced therefrom and so contoured as to cut higher, more nearly upstanding grass on one edge thereof, while on the opposite edge it tends to throw or direct the grass towards the first mentioned blade.

Another object of this invention is to provide a single wheel edging assembly adapted for actuation manually through the means of a handle wherein the wheel is provided with a gear for effecting the drive to an associated cutting mechanism which is in the form of an elongate body lying adjacent the wheel and projecting forwardly thereof and including a drive shaft driven from the gear, the body also carrying a pair of circumferentially spaced blade members underlying a sweep blade member and cooperable therewith to effect cutting action on the blades of grass impinged against the cutting blades under the action of the sweep blade.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

In the drawing:

FIG. 1 is a side elevational view of a multiple cut edging mechanism constructed in accordance with this invention;

FIG. 2 is a top plan view of the assembly shown in FIG. 1, but with the sweep blade removed therefrom to show better the details of the cutting blades;

FIG. 3 is a front elevational view of the cutting mechanism showing the relative disposition of the sweep blades relative to the cutting blade; and FIG. 4 is a front elevational view of the assembly as shown in FIG. 2.

The construction as seen in FIG. 1 incorporates a single wheel in the form of a rubber tire 10 mounted on an associated rim rigid with a hub as is conventional, but with the hub and rim assembly having a ring gear 11 rigid therewith and disposed in exposed position on one side of the wheel assemblage.

The central portion of the wheel is indicated by the reference character 12 and the hub or at least one side portion thereof, is indicated by the reference character 13, see particularly FIG. 2. The hub is hollow and receives therethrough a transversely extending axle shaft 15 which projects at opposite sides from the hub, being provided with a collar 16 fixed thereto at one end and projecting into a recessed boss 17 at its opposite end within which it is rigidly affixed as by means of set screw 18. The boss 17, in turn, is rigid with an elongate tube 19 which forms the main body portion of a cutter assembly indicated generally by the reference character 20.

The handle assembly for propelling the mechanism is indicated generally by the reference character 21 and includes an elongate handle member 22 preferably provided with a transverse hand grip member 23 at its upper extremity and terminating at its lower extremity in a fork indicated generally by the reference character 24. The fork presents a pair of spaced arms 25 and 26 which straddle the wheel assembly and which terminate at their free ends in apertured portions rotatably receiving the axle shaft 15. The wheel assembly is dished on the gear side thereof and the arm 25 of the fork 24 is angulated inwardly to accommodate itself within this dished portion and so as to clear the tube 19.

The previously mentioned collar 16 lies outside the arm 26 and the boss 17 performs a function similar to the collar 16 at the opposite end of the axle shaft. The boss 17, taken in conjunction with the collar 16 prevent lateral shifting of the cutter assembly 20 relative to the wheel and handle assemblies, as will be readily appreciated.

The tube 19, being hollow, rotatably receives a drive shaft 30 which projects completely through the tube beyond the opposite ends thereof. The tube 19 is substantially horizontally disposed and is diametrically related to the wheel and its rearward end face 31 terminates just inside the confines of the gear 11, substantially as shown in FIG. 1. The protruding portion of the drive shaft which extends rearwardly beyond the end face 31 of the tube receives a pinion 32 which is meshed with the teeth of the ring gear 11, this pinion being provided with a hub portion 33 snugly fitting upon the drive shaft 30 and being provided with a set screw 34 or similar means for fixing the pinion directly to the shaft.

The opposite end or forward end face of the tube 19 is indicated by the reference character 35 and the portion of the drive shaft which projects beyond this end face receives the hub 36 of a sweep blade assembly indicated generally by the reference character 37. The hub 36 is provided with some means, such as set screw 38, to fasten the sweep blade assembly to the drive shaft 30, as will be readily appreciated. Consequently, as the wheel is rotated, the drive shaft is rotated by virtue of the pinion 32 and, consequently, the sweep blade rotates. It will be noted that the rotation of the sweep blade is counterclockwise when viewed from the front as the mechanism is pushed in a forward direction.

In addition to the hub portion 17, the tube 19 is provided with a laterally inwardly extending projection or stop member 40, as shown in dotted line in FIG. 1. This stop member projects inwardly from the tube 19 a sufficient distance to engage the lower edge of the arm 25 and thus constrain the position of the tube 19 since its only real means of support is the axle shaft 15, exclusive of the stop member 40. The stop member and handle are so related that when the handle projects at a desired natural angle from the device, the tube 19 will be disposed substantially horizontally.

The sweep blade assembly 37 is preferably constructed of a single sheet of material suitably stamped into the proper shape as shown, such assembly being in accordance with the showing of FIG. 3 wherein it will be seen that a sheet from which it is formed may include an apertured central portion 41 and the radially extending circumferentially spaced blades 42. Naturally, the hub 36 is received within the opening in the central portion 41 and is rigidly affixed thereto by any suitable means, such as welding or the like.

Fixed to the tube 19 in depending relation therefrom is a bracket assembly indicated generally by the reference character 44. This bracket as can be best seen in FIG. 4 includes a plate portion 45 disposed within a plane transverse to the tube 19 and the forwardly projecting flanges 46 and 47 rigid with the opposite side edges of this plate portion 45. Two cutter blades 48 and 49 are supported by this bracket and each includes a substantially vertical leg 50 and 51 respectively which is apertured and in face-to-face contact with the forward face of the plate member and is pivotally affixed thereto by a single securing means such as the bolts 52 and 53. The legs 50 and 51 are spaced somewhat from the flanges 46 and 47 to permit of a limited amount of pivotal motion of the blades. The exact pivotal positioning of the blades is, however, controlled in each case by a pair of set screws, for example, set screws 55 and 56 carried by the flange 46 and engaging the leg 50 and the set screws 58 and 59 carried by the flange 47 and engaging the leg 51. Obviously, the set screws may be manipulated in pairs so as to achieve the desired pivotal positioning of the cutter blade members 48 and 49.

As can be seen in FIGS. 1 and 2, the cutter blades also include forwardly extending portions 60 and 61 respectively. The lowermost of these blades is the blade 49 and its forwardly projecting portion 61 is provided at its forward end with a downwardly tapering surface 62 which is intended to engage underneath and lift up the low lying blades of grass and those which may have been mashed down substantially flat. The other blade 48 is provided with a straight side 65 which is substantially parallel to the axis of the tube 19 and its inner side 66 is angulated with respect thereto to form a substantially sharp point 67 which trails the point 68 of the cutter blade assembly 49.

The edges 70 and 71 of the two cutter blade assemblies 48 and 49 respectively are the cutting edges and they are substantially parallel to each other. It will be appreciated that the angular disposition of the individual cutter blades as effected by the set screw adjustments 55—56, 58—59 is utilized to position the cutting edges 70 and 71 respectively in very close adjacency to the peripheral edge portions of the individual sweep blades 42.

The counterclockwise rotation of the sweep blade 37 will impinge blades of grass against the cutting edges 70 and 71 respectively and the edge 66 of the cutter blade 48 will tend to throw some grass towards the cutter blade 49, as will be readily appreciated, the sum effect of the two blades being to not only pick up and cut the low lying grass, but also to cut higher grass to one side with the net effect being that the two blades contour and properly cut substantially all of the grass in the region adjacent, for example, a sidewalk or the like, along which the device is particularly useful.

We claim:

1. A multiple cutting lawn trimmer comprising a wheel assembly including a wheel, a hub having a ring gear rigid therewith and concentrically disposed with respect thereto, said hub having a bore therethrough, an axle rotatably received within such bore and projecting on opposite sides of said hub, a cutter assembly mounted on one side of said wheel and including an elongate tube disposed substantially diametrically with respect to the wheel and being rigidly fixed to one projecting end of said axle, a drive shaft rotatably received within said tube and projecting beyond the opposite ends thereof, a pinion fixed to one end of said drive shaft and meshing with said ring gear, a sweep blade fixed to the opposite end of said drive shaft for rotation therewith and having a cutting edge, a cutter blade asembly fixed to said tube and extending in part beneath said sweep blade in close adjacency thereto, said cutteer blade assembly including a pair of cutter blades disposed in spaced relationship to each other and in circumferentially arranged relation with respect to said sweep blade, one of said cutter blades having a straight cutting edge lying parallel with and in substantially the same vertical plane as the axis of said drive shaft and the other of said cutter blades having a straight cutting edge disposed substantially parallel with and laterally offset from the first mentioned cutter edge and having an opposite side edge adjacent to and angulated with respect to the first mentioned cutting edge to define a tapered crotch therebetween so that blades of grass will be deflected toward the first mentioned cutting edge.

2. The assembly as defined in and by claim 1 wherein the first mentioned cutter blade is a wide blade disposed substantially parallel to the ground surface in a plane substantially perpendicular to the plane of said wheel.

3. The assembly as defined in and by claim 1 including a handle asembly mounted on said axle, said handle assembly including a fork portion having spaced legs straddling said wheel and receiving the opposite ends of said axle, said tube having a laterally projecting boss thereon between the tube and the wheel and in which one end of the axle is fixed the lower end of one of said legs being mounted on said one end of the axle between the tube and the wheel, and means for preventing rotation of said cutter blade asembly with said wheel.

References Cited in the file of this patent

UNITED STATES PATENTS

| Re. 24,729 | Sturgis | Oct. 27, 1959 |
| 362,516 | Kenyon | May 10, 1887 |
| 2,782,587 | Ott | Feb. 26, 1957 |